United States Patent [19]
David et al.

[11] Patent Number: 6,026,460
[45] Date of Patent: *Feb. 15, 2000

[54] METHOD AND APPARATUS FOR SEQUENCING SYSTEM BUS GRANTS AND DISABLING A POSTING BUFFER IN A BUS BRIDGE TO IMPROVE BUS EFFICIENCY

[75] Inventors: Howard S. David; Michael J. McTague, both of Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/644,180

[22] Filed: May 10, 1996

[51] Int. Cl.[7] .................................................. G04F 13/00
[52] U.S. Cl. ........................................... 710/129; 710/128
[58] Field of Search ................................... 395/293, 307, 395/309, 310; 710/129, 128

[56] References Cited

U.S. PATENT DOCUMENTS

| | | |
|---|---|---|
| 5,124,981 | 6/1992 | Golding . |
| 5,269,005 | 12/1993 | Heil et al. . |
| 5,327,570 | 7/1994 | Foster et al. . |
| 5,333,276 | 7/1994 | Solari . |
| 5,369,748 | 11/1994 | McFarland et al. . |
| 5,535,340 | 7/1996 | Bell et al. ................................ 395/292 |
| 5,546,546 | 8/1996 | Bell et al. ................................ 395/292 |
| 5,588,125 | 12/1996 | Bennett ................................... 395/306 |
| 5,613,075 | 3/1997 | Wade et al. .............................. 395/287 |
| 5,625,779 | 4/1997 | Solomon et al. ......................... 395/293 |

OTHER PUBLICATIONS

Dix, F.R., M. Kelly, and R.W. Klessig, "Access to a Public Switched Multi–Megabit Data Service Offering", Bell Communications Research, Inc., Red Bank, NJ, pp. 46–61.

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

Peripheral Components: Chip Sets, PC I/O Peripherals, Memory Controllers, UPI: Keyboard Controllers, Support Peripherals, Intel Corporation, 1994, pp. 1–419–1–429, 1–472, 1–508, & 1–512.

*Primary Examiner*—Ayaz R. Sheikh
*Assistant Examiner*—David A. Wiley
*Attorney, Agent, or Firm*—Blakely, Sokoloff, Taylor & Zafman LLP

[57] ABSTRACT

A method and apparatus for sequencing system bus grants and disabling a posting buffer in a bus bridge includes a bus activity monitor for monitoring bus cycles on a first bus, an inbound posting buffer, and a control logic. The control logic indicates whether to grant control of the first bus to a first processor on the first bus based on whether the inbound posting buffer is empty, and also controls disabling of posting to the inbound posting buffer. The control logic disables inbound posting responsive to both the first processor being backed off the system bus a predetermined number of times and the inbound posting buffer being empty.

8 Claims, 4 Drawing Sheets

METHOD AND APPARATUS FOR SEQUENCING SYSTEM BUS GRANTS AND DISABLING A POSTING BUFFER IN A BUS BRIDGE TO IMPROVE BUS EFFICIENCY

BACKGROUND OF THE INVENTION

1. Field of the Invention

The present invention pertains to data transfers in a computer system. More particularly, this invention relates to transferring data between two buses in a computer system using a bus bridge.

2. Background

As technology has progressed, the number, types, and functional power of computer system components has steadily increased. Given the large number and different operating speeds of different components, modern computer systems typically include two, three, or more buses for coupling together the different components.

One device commonly used to couple together two different buses is referred to as a bus bridge. Typically, requests transferred between buses via a bus bridge can be either posted or non-posted. A posted request refers to a request from a source agent on a source bus which has been accepted by the bridge, and the source agent knows that the request will be provided to the target agent on the target bus, regardless of whether the request has been actually delivered to the target agent yet or whether it is pending in a buffer in the bridge. A non-posted request refers to a request which is being transferred through the bus bridge and the source agent does not know whether the request can be delivered to the target agent until it is actually received by the target agent.

One important goal in designing a bus bridge is to provide an efficient communication path between the two buses. However, one problem that can arise when using a bus bridge is referred to as "thrashing". Thrashing refers to a situation where both of the buses are fully utilized, but very few, if any, data transfers between the two buses can progress. This situation can arise, for example, in a system involving a bus bridge coupling together a system bus and a Peripheral Component Interconnect (PCI) bus, such as a bus in accordance with the PCI Local Bus Specification, Version 2.1, published Jun. 1, 1995. If an agent on the PCI bus is writing to main memory on the system bus and posting in the bus bridge is disabled, then if a processor on the system bus is repetitively issuing requests targeting the PCI bus, the requests by the agent and the processor can prevent the requests of the other from progressing. When thrashing occurs, data transfers between the two buses cannot be made. The thrashing situation may eventually work itself out by chance, but it can also persist indefinitely. Furthermore, the requests which are causing the thrashing to occur may also lock up the two buses such that no other requests can be issued by other agents on those buses. Thus, it would be beneficial to provide a system which reduces thrashing in a computer system.

One solution to this thrashing problem is to disable the posting buffers as soon as the thrashing situation is detected. However, this can result in keeping a postable write transaction from an I/O bus from being able to be completed by posting data. This forces the I/O bus to slow to the speed necessary to synchronize it to the system bus, via the bus bridge, in order to perform a nonpostable transaction, thereby reducing the speed at which the transaction is completed. Thus, it would be beneficial to provide a system which reduces the period of time during which the posting of data from the I/O bus to the system bus is disabled.

As will be described in more detail below, the present invention provides a method and apparatus for sequencing system bus grants and disabling a posting buffer in a bus bridge that achieves these and other desired results which will be apparent to those skilled in the art from the description to follow.

SUMMARY OF THE INVENTION

A method and apparatus for sequencing system bus grants and disabling a posting buffer in a bus bridge to improve bus efficiency is described herein. The bus bridge includes a bus activity monitor for monitoring bus cycles on a first bus, an inbound posting buffer, and a control logic. The control logic indicates whether to grant control of the first bus to a first processor on the first bus based on whether the inbound posting buffer is empty, and also controls disabling of posting to the inbound posting buffer. The control logic disables inbound posting responsive to both the first processor being backed off the system bus a predetermined number of times and the inbound posting buffer being empty.

In one embodiment, when the first processor has been backed off the first bus once, the control logic checks whether the inbound posting buffer is empty. When the buffer is empty, the control logic disables posting to the inbound posting buffer, then waits a predetermined period of time, and then re-checks whether the buffer is empty. When this re-check indicates the buffer is still empty, the control logic indicates that control of the first bus may be granted to the first processor. Once the first processor completes its transaction on the first bus, posting to the inbound posting buffer is reenabled.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the descriptions which follow, reference is made to various signals being asserted or deasserted. In order to avoid confusion, most of these signals have been discussed as being asserted when in a high state and deasserted when in a low state (referred to as "active high" signals). A high state typically represents a voltage of between 1.8 and 5.5 volts, and a low state typically represents a voltage of between 0.0 and 0.5 volts. However, it is to be appreciated that the present invention can be implemented with signals which are asserted in a low state and deasserted in a high state (referred to as "active low" signals), or a combination of active high and active low signals.

The present invention provides a method and apparatus for sequencing system bus grants and disabling a posting buffer in a bus bridge to improve bus efficiency. In the present invention, when a processor on a system bus has been backed off the system bus a predetermined number of times and the arbitration unit has determined that it is ready to grant the system bus to that processor, control logic within the bridge checks whether the inbound posting buffer is empty. The control logic disables the inbound posting buffer as soon as the inbound posting buffer is empty. After a predetermined period of time, the buffer is rechecked, and when it is empty, the processor is granted control of the system bus. Immediately after the processor completes its bus cycle on the system bus, posting to the inbound posting buffer is reenabled. Thus, disabling of inbound posting and granting control of the system bus to the processor are sequenced so that inbound posting is disabled just long enough to allow the processor cycle to be completed. The processor request may be either completed successfully, or the processor may be backed off which causes this sequence to be repeated.

Figure 1:
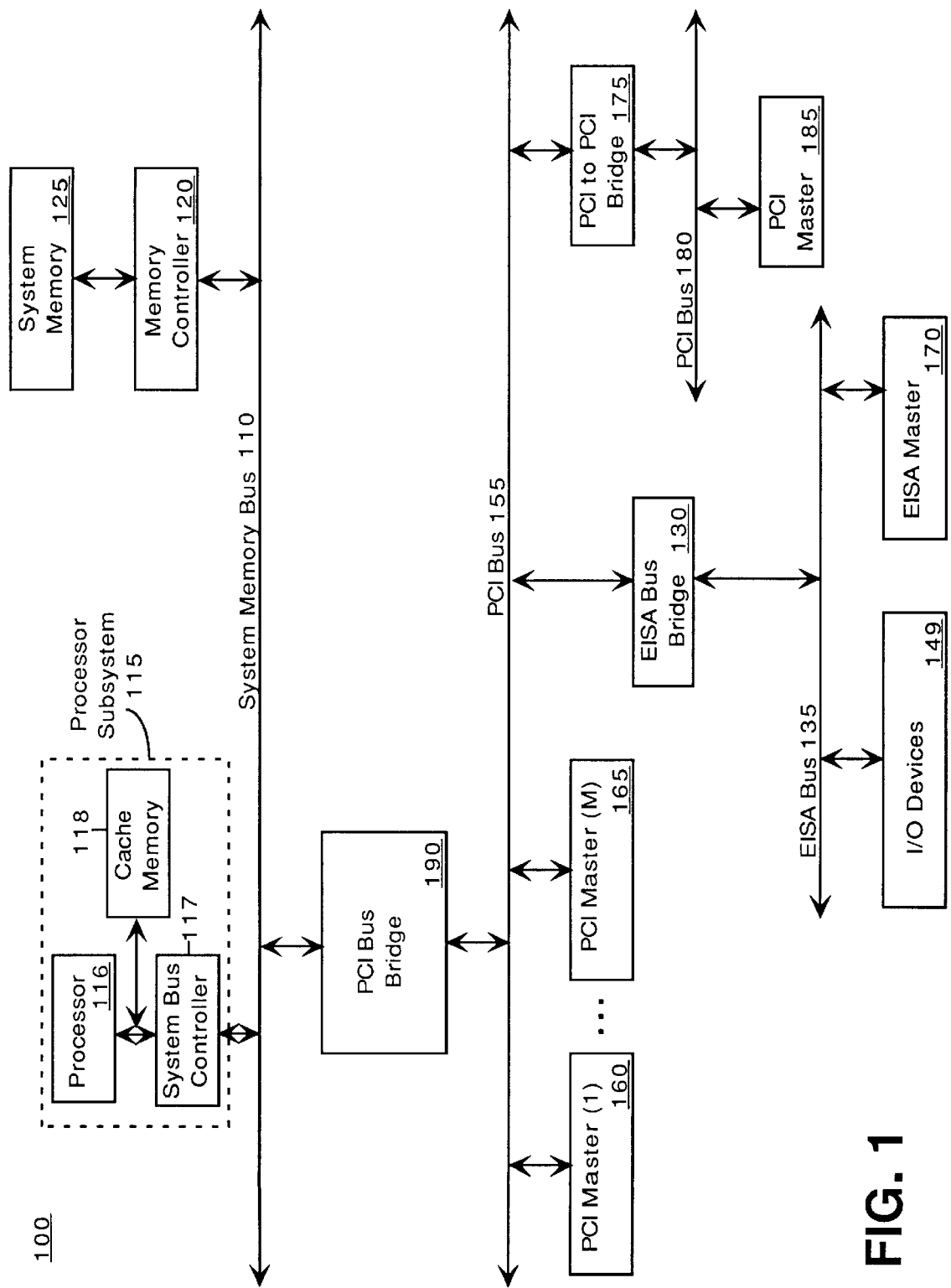
FIG. 1 is a block diagram of a computer system such as may be used with the present invention.

FIG. 1 is a block diagram of a computer system such as may be used with the present invention. A computer system 100 is shown comprising a system-memory bus or other communication device 110 for communicating information to and from the processor sub-system 115. In one embodiment, the system bus 110 includes address, data and control buses. In one implementation, the present invention includes an Intel architecture microprocessor 116 as part of the processor sub-system 115, such as a Pentium® processor, available from Intel Corporation of Santa Clara, Calif.; however, the present invention may utilize any type of processor architecture. The processor 116 is for processing information and instructions. The processor sub-system 115 may also contain a system bus controller 117 for providing an interface between the processor 116 and the system bus 110, and a cache memory 118 for temporarily storing information and/or instructions for the processor 116. In an alternate embodiment, the processor 116 is coupled directly to the system bus 110 rather than being part of the processor sub-system 115. The system 100 also includes a memory controller 120 and a system memory 125 of random access memory (RAM) coupled with the system bus 110 for storing information and instructions for the processor 116.

A bridge is also coupled to the system bus 110 for coupling the processor bus 110 to one or more additional, typically I/O, buses. Each of these additional buses typical includes address, data, and control lines. In one embodiment, this bus is a PCI bus 155, as described in The PCI Local Bus Specification, Version 2.1, published Jun. 1, 1995. A PCI bus bridge 150 couples the system bus 110 to the PCI bus 155. Multiple PCI bus masters 160 and 165 (also referred to herein as bus agents) can be coupled to the PCI bus 155. These PCI bus masters 160 and 165 can be any of a wide variety of components, including a mass storage device such as a magnetic or optical disk and disk drive, and a video controller and display device. Additional devices which can be coupled to the PCI bus 155 include, for example, a read only memory (ROM), an alphanumeric input device including alphanumeric and function keys, a cursor control device, a hard copy device such as a plotter or printer, or a network adapter device such as a Local Area Network (LAN) adapter.

In one embodiment, the PCI bus 155 is also coupled to an Extended Industry Standard Architecture (EISA) bus 135 via an EISA bus bridge 130. Multiple I/O devices 140 and EISA bus master devices 170 (both of which are also referred to herein as bus agents) can be coupled to the EISA bus 135 which input and output data to and from the processor 116, via the EISA bus bridge 130, PCI bus 155, PCI bus bridge 150, and system bus 110. Additionally, EISA bus master devices 170 can also input and output data to and/or from other devices in the system 100. These devices may include any of the I/O devices which can be coupled to the PCI bus 155 as discussed above, such as a ROM, an alphanumeric input device, a network adapter, etc.

In one embodiment, a second PCI bus 180 is also coupled to the PCI bus 155 via a PCI to PCI bus bridge 175. Additional PCI bus masters 185 can be coupled to the PCI bus 180, analogous to PCI bus masters 160 and 165.

In one implementation, the control lines of the system bus 110 (such as the backoff signal, discussed below), and the control lines of the PCI buses 155 and 180 (such as the retry signal, discussed below) are asserted when in a low state and deasserted when in a high state.

In one embodiment, a third PCI bus bridge (not shown) is coupled to the system bus 110 via another PCI bus bridge (not shown), analogous to the PCI bus 155 and the PCI bus bridge 150.

It is to be appreciated that certain implementations of the system 100 may include additional processors or other components. For example, two or more processor sub-systems 115 having processors 116 of the same or different types may be coupled to the system bus 110. Furthermore, certain implementations of the present invention may not require nor include all of the above components. For example, PCI masters 160 and 165 may not include a display device. Alternatively, the system 100 may not include an EISA bus 135 and EISA bus bridge 130, or a PCI bus 180 and PCI to PCI bus bridge 175.

It is also to be appreciated that alternate embodiments of the system 100 can include additional buses and bus bridges. For example, multiple PCI buses with corresponding bus bridges may be coupled to the PCI bus 155 or the system bus 110. By way of another example, additional hierarchical levels of PCI buses may be included, such as an additional PCI bus coupled to PCI bus 155 or PCI bus 180 via an additional PCI bus bridge.

Figure 2:
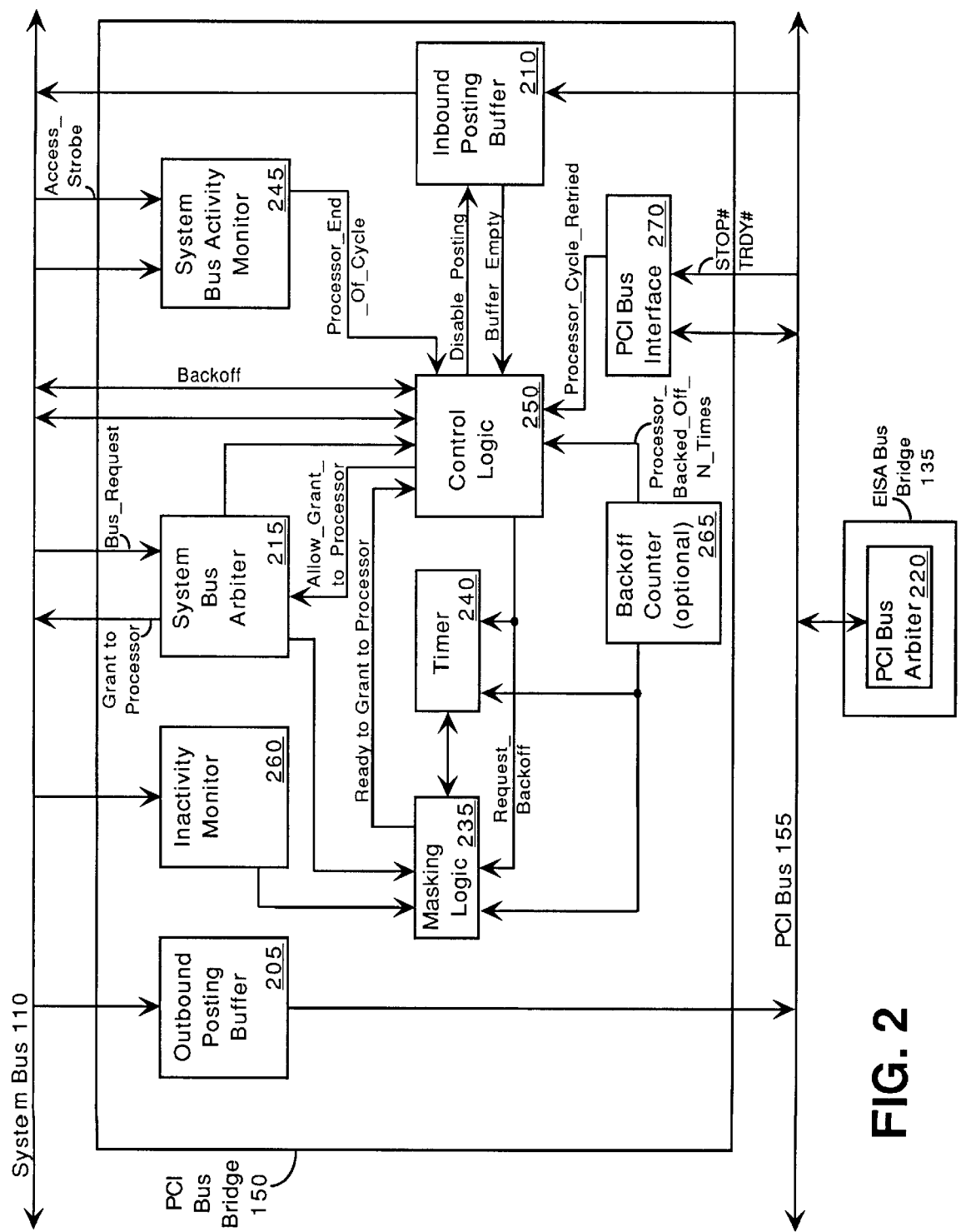
FIG. 2 is a block diagram illustrating a bus bridge according to one embodiment of the present invention.

FIG. 2 is a block diagram illustrating a bus bridge according to one embodiment of the present invention. PCI bus bridge 150 includes an outbound posting buffer 205 and an inbound posting buffer 210 for buffering posted transactions. In the illustrated embodiment, "outbound" transactions refer to transactions from the system bus 110 targeting an agent on the PCI bus 155, and "inbound" transactions refer to transactions from the PCI bus 155 targeting an agent on the system bus 110. In one embodiment of the present invention, only write requests can be posted.

In one embodiment of the present invention, read requests are not permitted to be posted. Thus, a read request which issues on the system bus 110 and targets an agent on another bus passes through the bridge 150 and is issued on the PCI bus 155. In one embodiment, the system bus 110 is a single transaction bus, referring to the system bus 110 supporting only one transaction pending on the system bus 110 at a time.

In the discussions to follow, reference is made to a processor on the system bus 110 issuing a request. However, it is to be appreciated that other agents coupled to the system bus 110 could also issue a request.

Arbitration for the system bus 110 is controlled by a system bus arbiter 215 in the PCI bus bridge 150, whereas arbitration for the PCI bus 155 is controlled by a PCI bus arbiter 220, which is in the EISA bus bridge 135. A processor or other master which desires to issue a request on the system bus 110 (also referred to as a source agent) asserts a bus_request signal to the system bus arbiter 215. Eventually, the system bus arbiter 215 grants control of the system bus 110 to the requesting processor. If the request is a non-postable request targeting an agent on the PCI bus 155 (for example, a read request to either a PCI master on the PCI bus 155 or an I/O device on the EISA bus 135 of FIG. 1), then the request is not posted, and the bus bridge 150, via control logic 250, attempts to gain control of the PCI bus 155 by asserting a bus_request signal to the PCI bus arbiter 220.

If the PCI bus 155 is available, then control of the PCI bus 155 is granted to the PCI bus bridge 150. In this situation, the request is issued on the PCI bus 155. It is to be appreciated, however, that the request may not yet be satisfied. For example, if the request targets an agent on the PCI bus 180 or on the EISA bus 135, then the request may be re-tried or otherwise denied access to the PCI bus 180 or the EISA bus 135. In this situation, a "backoff" signal is returned to the requesting processor on the system bus 110. The backoff signal indicates to the requesting processor that the request could not be completed at the present time and that the bus cycle begun by the requesting processor is to be terminated and retried at a later time, if desired by the requesting processor or required by the system bus protocol, so that the system bus 110 is available to the PCI bus bridge 150.

Additionally, in one embodiment of the present invention, it is not possible for a processor on system bus 110 to read from agents on the PCI bus 155 if the inbound buffers 210 are not empty. This inability to read can be referred to as a buffer resource conflict. Thus, in this embodiment, if the inbound write posting buffers 210 in the PCI bridge 150 are not empty and the requesting processor issues a non-postable request to the PCI bridge 150, then the control logic 250 asserts a backoff signal to the requesting processor on the system bus 110.

A similar interlock situation can also arise in the EISA bus bridge 130, the PCI to PCI bridge 175, or an "interlocked" version of PCI master 160. For each of these bus agents, inbound posted write data internal to the agent may prevent an outbound read from the system bus 110 from completing, either on a bus further removed from the system bus 110, or within the particular agent itself. The agent which prevents the outbound read from completing retries the requesting agent, which is PCI bus bridge 150, which then backs off the requesting processor on the system bus 110.

Typically, if a processor is backed off, it will immediately repeat its request by again asserting a bus_request signal to the system bus arbiter 215. In one embodiment, the system bus arbiter 215 employs an arbitration policy wherein a processor which is backed off from the system bus 110 is given the highest priority for the next arbitration cycle. This policy ensures that the processor can immediately gain control of the system bus 110 again after being backed off, subject to any masking of the processor bus request discussed below.

In one embodiment of the present invention, if a processor initiated cycle is retried on the PCI bus 155 by an agent coupled to the PCI bus 155, a PCI bus interface 270 in the bridge 150 samples STOP# asserted and TRDY# negated on the PCI bus 155. The PCI bus interface 270 then asserts a processor_cycle_retried signal to the control logic 250, in response to which the control logic 250 asserts a backoff signal to the requesting processor, and asserts a request_backoff signal to the masking logic 235, timer 240, and backoff counter 265. In one implementation, the STOP# and TRDY# signals are low true signals (that is, true when in a low state) on the PCI bus 155.

In one embodiment of the present invention, when a processor is backed off, the requests for control of the bus from that processor are masked off for a predetermined period of time. Thus, even though the processor may immediately reassert its bus_request signal after being backed off, the bus_request signal is ignored for this predetermined period of time. The processor request is masked off for the period of time indicated by the timer 240. When a processor is backed off, a request_backoff signal is asserted to the timer 240 and the masking logic 235 from the control logic 250, which causes the timer 240 to start. In one embodiment, the timer 240 is a 16 microsecond timer. However, it is to be appreciated that different values can be used. Typical values for the timer 240 range from 1 microsecond to 64 microseconds. In one embodiment, this value of timer 240 is programmable. It should be noted that the timer 240 should have a value which provides sufficient time for a PCI master on the PCI bus 155 to perform a read or write request on the system bus 110, taking into account the time necessary for propagation of the request through the bridge 150 and the handshaking between the bridge 150 and the target agent (such as system memory 125) on the system bus 110, as well as other data transfer protocols which are to be satisfied.

The timer 240 begins counting upon receiving the request_backoff signal from the control logic 250, indicating that the processor needs to be backed off. In an alternate embodiment, the timer 240 begins counting as soon as the processor releases the system bus 110. When the timer 240 expires, the timer 240 asserts a signal to the masking logic 235. In response to this signal from the timer 240, the masking logic 235 sends a ready_to_grant_to_processor signal to the control logic 250, indicating that it is ready to unmask the processor. In one embodiment of the present invention, an inactivity monitor circuit 260 detects a fixed period of inactivity on the system bus 110 (for example, two microseconds), which causes an assertion of the ready_to_grant_to_processor signal to the control logic 250 even though the timer 240 may not have expired yet. In one implementation, the inactivity monitor 260 monitors an I/O request signal asserted to the system bus arbiter 215 from the control logic 250 whenever a PCI bus master issues a request to an agent on the system bus 110.

Upon receipt of a signal from the masking logic 235 indicating that the masking logic 235 is ready to unmask the processor (ready to grant control of the system bus 110 to the processor), the control logic 250 checks the status of the inbound posting buffer 210. In the embodiment shown, this checking is done by checking whether a buffer_empty signal received from the inbound posting buffer 210 is asserted. The buffer_empty signal can be asserted in any of a wide variety of manners. For example, each entry in the inbound posting buffer 210 can have a corresponding valid bit which is set whenever valid data is in the entry. Thus, if none of these valid bits are set, then the buffer_empty signal is asserted.

If the buffer 210 is not empty, then the control logic 250 waits for the buffer to become empty. Once empty, the control logic 250 disables further write posting to the inbound posting buffer 210. In the embodiment shown, this disabling is done by asserting a disable_posting signal to the inbound posting buffer 210.

However, because of the non-immediacy of disabling the posting to the inbound posting buffer 210, it is possible that some additional write data may have been posted before the disable_posting signal could be asserted and acted upon by the inbound posting buffer 210. Thus, the control logic 250 waits a predetermined period of time, and then checks again whether the inbound posting buffer 210 is empty. If the inbound posting buffer 210 is not empty, then the control logic 250 continues to assert the disable_posting signal, and continues to check at predetermined intervals, or alternatively checks continually, whether the inbound posting buffer 210 is empty.

Eventually, the inbound posting buffer 210 will be empty. At this point, the control logic 250 asserts a signal to the system bus arbiter 215 indicating that the arbiter 215 may grant control of the system bus 110 to the processor. Thus, the next request for the system bus 110 by the processor will be granted by the system bus arbiter 215.

The PCI bus bridge 150 also includes a system bus activity monitor 245. The system bus activity monitor 245 continually monitors the system bus 110 for processor activity, monitoring the access_strobe signal and bus ownership signals on the system bus 110. Whenever a bus cycle from a processor completes on the system bus 110, the system bus activity monitor 245 asserts a processor_end_of_cycle signal to the control logic 250.

After the control logic 250 has asserted the allow_grant_to_processor signal to the system bus arbiter 215, the system bus arbiter grants the system bus 110 to the processor. The processor performs its bus cycle, either with a successful completion, or a backoff. Subsequently, once the system bus activity logic 245 asserts the processor_end_of_cycle signal (indicating the completion of the bus cycle by the processor), the control logic 250 deasserts the disable_posting signal to the inbound posting buffer 210, thereby reenabling inbound posting. In one implementation, the disable_posting signal is deasserted one clock cycle after the processor_end_of_cycle is asserted.

Thus, the period of time in which the inbound posting is disabled is reduced. The inbound posting is not disabled until the bridge determines it can allow control of the system bus 110 to be granted to the requesting processor, and the inbound posting is reenabled as soon as the bus cycle by the requesting processor has completed.

In the embodiments discussed above, the control logic 250 detects whether a processor has been backed off. In alternate embodiments, different backoff counts are used, such as two, three, four, etc. In these alternate embodiments, a counter 265 is added to support the control logic 250 so that the inbound posting buffer 210 is only disabled after two or more backoffs. When the backoff counter 265 indicates the processor has been backed off the appropriate number of times, the backoff counter asserts a processor_backed_off_N_times signal to the control logic 250.

Additionally, in the embodiments discussed above, the processor request is masked off the first time a backoff occurs. In alternate embodiments, different backoff counts are used, such as two, three, four, etc. In these alternate embodiments, a counter 265 is added to support the masking logic 235, so that processor request masking is only enabled after two or more backoffs. The counter 265 which indicates how many backoffs should occur before masking the processor bus request, and the counter discussed above which indicates how many backoffs should occur before disabling the inbound posting buffer 210 can be the same counter (as shown), or alternatively can be two different counters having the same or different values.

Also in the embodiments discussed above, the arbitration policy employed by the system bus arbiter 215 gives a processor which is backed off from the bus the highest priority in the next arbitration cycle (subject to the masking of the processor). In alternate embodiments which support multiple processors coupled to the system bus 110 allow processor transactions to occur after another processor has been backed off, different arbitration policies can be supported. In these alternate embodiments, additional tracking of processor requests can be employed in the bus bridge 150 to properly track the number of consecutive retries given to a particular processor. For example, a different backoff counter 265 could be used for each possible processor in the system, or a processor identifier could be recorded.

Also in the embodiments discussed above, a single PCI bus bridge 150 is described. It is to be appreciated, however, that alternate embodiments can include computer systems having multiple PCI bus bridges analogous to bridge 150. It is to be appreciated that in these alternate embodiments, if multiple PCI bus bridges 150 are connected to the same system bus 110, then only one of the bridges is responsible for arbitration via its system bus arbiter 215. The other bus bridges request access for the system bus from the system bus arbiter in the one bridge responsible for arbitration.

It is also to be appreciated that although the system bus arbiter 215 is shown as being part of the PCI bus bridge 150 and the PCI bus arbiter 220 is shown as being part of the EISA bus bridge 135, in alternate embodiments the arbiters 215 and 220 can be located in different components. For example, the PCI bus arbiter 220 can alternatively be located in another PCI master on the PCI bus 155 or the PCI bus bridge 150, or can be a separate arbiter device coupled to the PCI bus 155. Similarly, the system bus arbiter 215 can be part of another device, such as the memory controller or a processor, on the system bus 110, or can be a separate arbiter device coupled to the system bus 110.

In the illustrated embodiment, the control logic 250 determines when control of the system bus 110 may be granted to the requesting processor in response to the ready_to_grant_to_processor signal from the masking logic 235. However, it is to be appreciated that alternate embodiments of the present invention do not require the masking logic 235 or the timer 240. In these alternate embodiments, the system bus arbiter 215 asserts the ready_to_grant_to_processor signal to the control logic 250 whenever the arbitration policy employed by the system bus arbiter 215 indicates the processor should have control of the system bus 110. Additionally, other alternate embodiments could leave out the inactivity monitor 260 so that there is no assertion of the ready_to_grant_to_processor signal prior to expiration of the timer 240.

Figure 3:
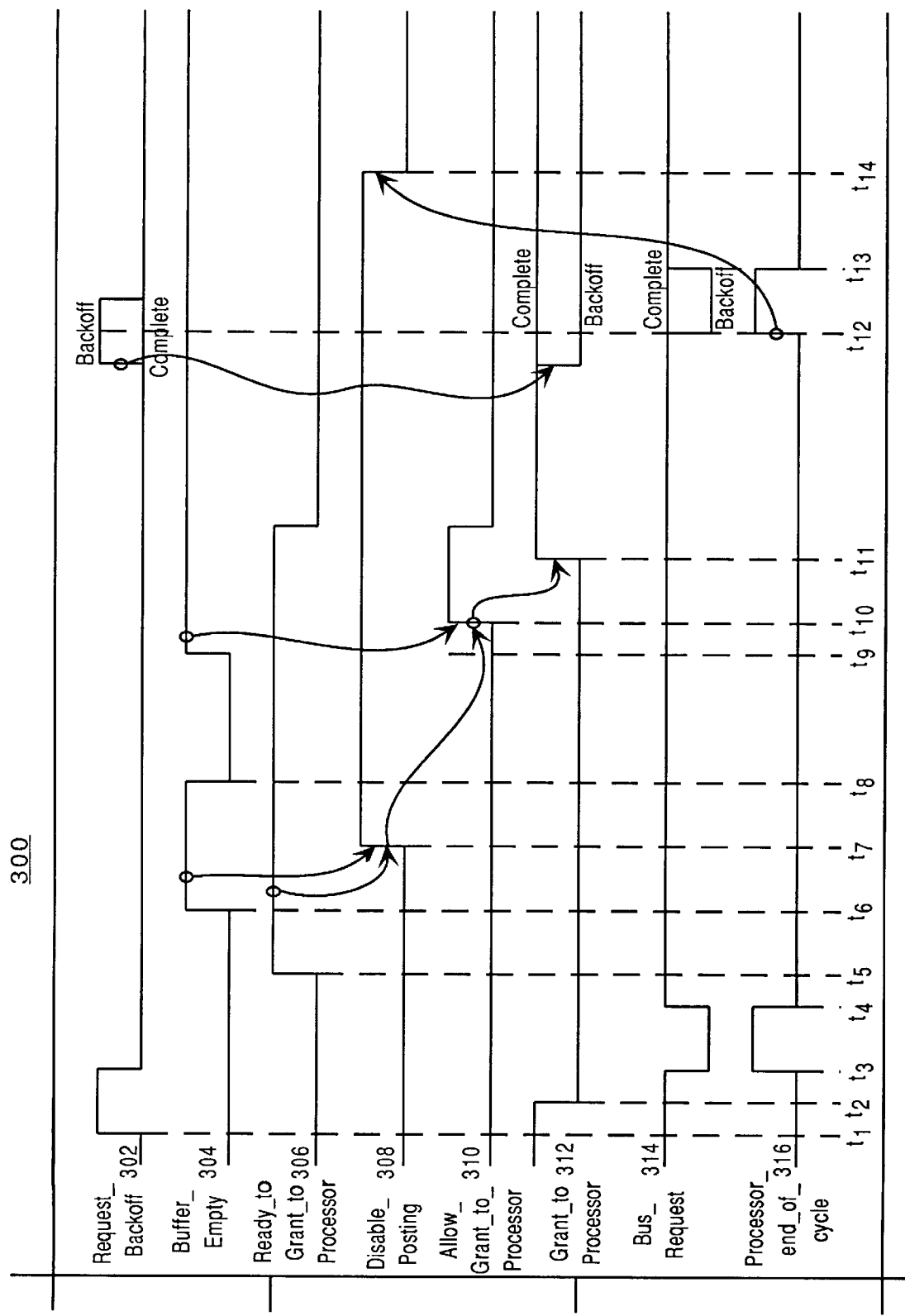
FIG. 3 is a timing diagram illustrating the timing of signals according to one embodiment of the present invention.

FIG. 3 is a timing diagram illustrating the timing of signals according to one embodiment of the present invention. The timing diagram 300 illustrates the sequencing of signals in the determining of when to grant control of the system bus to the requesting processor and the disabling and reenabling of the inbound posting buffer according to one embodiment of the present invention. Table I shows a summary of the signals discussed in FIG. 3.

TABLE I

| Signal | Description |
| --- | --- |
| request_backoff | Asserted by the control logic when a processor needs to be backed off. |
| buffer_empty | Asserted by the inbound posting buffer when the inbound posting buffer is empty, and deasserted when there is data pending in the inbound posting buffer. |
| ready_to_grant_to_processor | Asserted by the masking logic when the time for masking the processor from being granted the system bus expires. |
| disable_posting | Asserted by the control logic to disable inbound posting, and deasserted to reenable inbound posting. |
| allow_grant_to_processor | Asserted by the control logic to the system bus arbiter when it is permissible for the processor to be granted control of the system bus. |
| grant_to_processor | Asserted by the system bus arbiter to the processor to grant control of the system bus to the processor. |
| bus_request | Asserted by a processor via a system bus controller in a processor sub-system to request control of the system bus. |
| processor_end_of_cycle | Asserted by the system bus activity monitor to indicate when a processor bus cycle has completed on the system bus. |

When a requesting processor from the system bus needs to be backed off, for example because of a PCI bus retry or a buffer resource conflict, the control logic asserts a request_backoff signal 302, time $t_1$. In response to the request_backoff signal 302, the grant_to_processor signal 312 is deasserted at time $t_2$, and the processor_end_of_cycle signal 316 is asserted from time $t_3$ to time $t_4$. The processor request is then unmasked after a predetermined period of time, at time $t_5$ (or, if masking logic is not being used, the arbiter indicates it is ready to grant to the processor at time $t_5$).

In response to the ready_to_grant_to_processor signal 306, the control logic checks whether the buffer_empty signal 304 is asserted. When both the ready_to_grant_to_ signal 306 and the buffer_empty signal 304 are asserted, time $t_6$, the control logic asserts the disable_posting signal 308, time $t_7$. As discussed above, some data may be posted in the inbound posting buffer before the disable_posting signal 308 can be acted upon. Thus, the buffer_empty signal 304 may be deasserted again, time $t_8$. It is to be appreciated that between time $t_6$ and time $t_9$, the buffer_empty signal 304 can be asserted or deasserted, depending on whether data is posted before the disable_posting signal 308 can be acted upon.

The control logic thus waits for a predetermined period of time, and then checks whether the buffer_empty signal 304 is still asserted, time tg. In one implementation, this predetermined period of time (time $t_9$–$t_7$) is 300 nanoseconds. In response to the buffer_empty signal 304 being asserted at time $t_9$, the control logic asserts the allow_grant_to_processor signal 310 at time $t_{10}$. In response to the allow_grant_to_processor signal 310, the system bus arbiter grants control of the system bus to the processor, time $t_{11}$.

After the processor has been granted the system bus, a bus cycle will start on the system bus. In response to the completion of the bus cycle, the system bus activity monitor asserts the processor_end_of_cycle signal 316, time $t_{12}$ to time $t_{13}$.

In response to the assertion of the processor_end_of_cycle signal 316, time $t_{12}$, the control logic deasserts the disable_posting signal 308, time $t_{14}$. Thus, inbound posting is reenabled immediately after the completion of the cycle from the processor on the system bus.

It should be noted that, as illustrated in FIG. 3, when the processor_end_of_cycle signal 316 is asserted at time $t_{12}$, the processor can either be backed off again or the processor's request can be completed. If the processor is backed off again, then the request_backoff signal 302 is asserted, the bus_request signal 314 is deasserted, and the grant_to_processor signal 312 is deasserted, as shown. However, if the processor's request is completed, then the request_backoff signal 302 remains deasserted, the bus_request signal 314 remains asserted, and the grant_to_processor signal 312 remains asserted, as shown.

Figure 4:
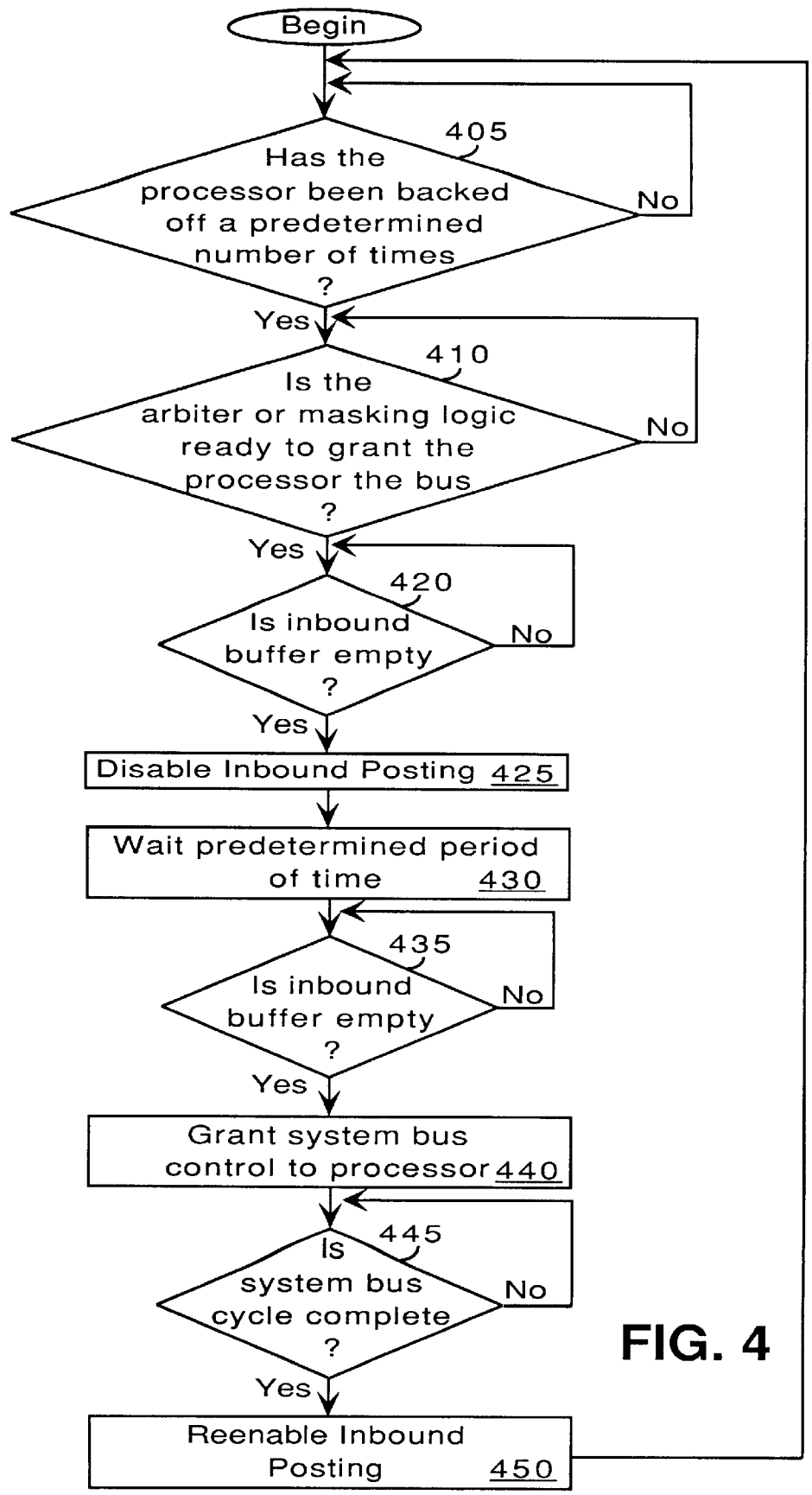
FIG. 4 is a flowchart illustrating the steps followed within a bus bridge according to one embodiment of the present invention.

FIG. 4 is a flowchart illustrating the steps followed within a bus bridge according to one embodiment of the present invention. First, control logic in the bridge continually checks whether a processor has been backed off the system bus a predetermined number of times (for example, once), step 405. Once this condition is satisfied, the control logic checks whether it has received a ready_to_grant_to_processor signal from the masking logic (or arbiter, as discussed above), step 410. Once the ready_to_grant_to_processor signal has been received, the control logic in the bridge checks whether the inbound posting buffer is empty, step 420. If the inbound posting buffer is not empty, the control logic continually checks whether the buffer is empty until the buffer is empty. Once the inbound posting buffer is empty, the control logic in the bridge disables inbound posting, step 425.

The control logic in the bridge then waits a predetermined period of time, step 430, and rechecks whether the inbound posting buffer is empty, step 435. If the inbound posting buffer is no longer empty, then the control logic continues to check whether the buffer is empty until the buffer is empty. Once the buffer is empty, the system bus arbiter grants control of the system bus to the processor, step 440.

After control of the system bus has been granted to the processor, the control logic in the bridge continually checks whether a processor_end_of_cycle signal is received from the system bus activity monitor, step 445. Once the bus cycle is complete, the control logic in the bridge reenables inbound posting, step 450.

In one embodiment of the present invention discussed above, the present invention disables posting to the inbound posting buffer, waits for a predetermined period of time, and then re-checks that the inbound buffer is still empty. In an alternate embodiment of the present invention, the control logic waits until the buffer has been empty for the predetermined period of time before disabling posting to the inbound posting buffer.

Thus, the present invention provides for the sequencing of system bus grants and disabling a posting buffer in a bus bridge to improve bus efficiency. The posting buffer is disabled just long enough to allow a processor cycle to be completed, thereby allowing the posting buffer to be enabled for longer periods of time. Additionally, thrashing in the computer system is reduced, thereby improving the efficiency of both buses coupled to the bus bridge.

Whereas many alterations and modifications of the present invention will be comprehended by a person skilled in the art after having read the foregoing description it is to be understood that the particular embodiments shown and described by way of illustration are in no way intended to be considered limiting. References to details of particular embodiments are not intended to limit the scope of the claims.

Thus, a method and apparatus for sequencing system bus grants and disabling a posting buffer in a bus bridge to reduce thrashing has been described.

What is claimed is:

1. A method of reducing thrashing in a bus bridge comprising:
   (a) determining whether a processor has been backed off a first bus a predetermined number of times;
   (b) masking off requests from the processor for a predetermined period of time in response to the processor being backed off the predetermined number of times;
   (c) checking whether an inbound posting buffer is empty;
   (d) disabling posting to the inbound posting buffer responsive to the inbound posting buffer being empty;
   (e) re-checking whether the inbound posting buffer is empty after waiting a predetermined period of time;
   (f) allowing control of the first bus to be granted to the processor responsive to the inbound posting buffer being empty;
   (g) checking whether a bus cycle on the first bus is complete; and
   (h) re-enabling posting to the inbound posting buffer one clock cycle after the bus cycle is complete.

2. A computer system comprising:
   a first bus;
   a second bus;
   one or more processors coupled to the first bus;
   one or more agents coupled to the second bus; and
   a bus bridge coupled to the first bus and the second bus, wherein the bus bridge includes,
      a bus activity monitor to monitor bus cycles on the first bus,
      an inbound posting buffer, and
      a control logic, coupled to the bus activity monitor and the inbound posting buffer, to indicate whether to grant control of the first bus to a first processor of the one or more processors based on whether the inbound posting buffer is empty, to disable posting to the inbound posting buffer in response to both the first processor being backed off the first bus a predetermined number of times and the inbound posting buffer being empty, to mask off requests from the first processor for a predetermined period of time in response to the first processor being backed off the first bus a predetermined number of times, to determine when a bus cycle on the first bus is complete, and to re-enable posting to the inbound posting buffer one clock cycle after the bus cycle is complete.

3. The computer system as claimed in claim 2, wherein the bus bridge further comprises a backoff counter to indicate whether the first processor has been backed off the first bus the predetermined number of times.

4. The computer system as claimed in claim 2, wherein the second bus is a Peripheral Component Interconnect (PCI) bus.

5. A bus bridge comprising:
   a bus activity monitor to monitor bus cycles on the first bus;
   an inbound posting buffer; and
   a control logic, coupled to the bus activity monitor and the inbound posting buffer, to indicate whether to grant control of the first bus to a first processor of the one or more processors based on whether the inbound posting buffer is empty, to disable posting to the inbound posting buffer in response to both the first processor being backed off the first bus a predetermined number of times and the inbound posting buffer being empty, to mask off requests from the first processor for a predetermined period of time in response to the first processor being backed off the first bus a predetermined number of times, to determine when a bus cycle on the first bus is complete, and to re-enable posting to the inbound posting buffer one clock cycle after the bus cycle is complete.

6. The bus bridge as claimed in claim 5, further comprising a backoff counter to indicate whether the first processor has been backed off the first bus the predetermined number of times.

7. The bus bridge as claimed in claim 5, wherein the inbound posting buffer is coupled to a Peripheral Component Interconnect (PCI) bus.

8. An apparatus comprising:
   means for determining whether a processor has been backed off a first bus a predetermined number of times;
   means for masking off requests from the processor for a predetermined period of time in response to the processor being backed off a predetermined number of times;
   means for checking whether an inbound posting buffer is empty;
   means for disabling posting to the inbound posting buffer responsive to the inbound posting buffer being empty;
   means for re-checking whether the inbound posting buffer is empty after waiting a predetermined period of time;
   means for allowing control of the first bus to be granted to the processor responsive to the means for re-checking indicating the inbound posting buffer is empty
   means for checking whether a bus cycle on the first bus is complete; and
   means for re-enabling posting to the inbound posting buffer one clock cycle after the bus cycle is complete.

* * * * *

UNITED STATES PATENT AND TRADEMARK OFFICE
CERTIFICATE OF CORRECTION

PATENT NO. : 6,026,460
DATED : February 15, 2000
INVENTOR(S) : David et al.

It is certified that error appears in the above-identified patent and that said Letters Patent is hereby corrected as shown below:

In column 9, at line 39, after "grant_to_", insert --processor.--

Signed and Sealed this

Eighth Day of May, 2001

Attest:

NICHOLAS P. GODICI

Attesting Officer        Acting Director of the United States Patent and Trademark Office